UNITED STATES PATENT OFFICE.

WILLIAM S. LONG, OF ST. LOUIS, MISSOURI, ASSIGNOR TO HIMSELF, DWIGHT TREADWAY, WILLIAM J. H. BROWN, AND LOUIS C. GOOD, ALL OF SAME PLACE.

PROCESS OF COATING AND COLORING COFFEE.

SPECIFICATION forming part of Letters Patent No. 326,227, dated September 15, 1885.

Application filed February 24, 1885. (No specimens.)

*To all whom it may concern:*

Be it known that I, WILLIAM S. LONG, of St. Louis, Missouri, have invented a new and useful Process for Treating Coffee and Analogous Products, of which the following is a full, clear, and exact description.

My invention is particularly directed to giving to the berries of green coffee and analogous products to which the process is applicable—such as nuts, beans, &c.—a capacity for resisting the action of the air, which, according to its degree of humidity, dries or dampens said berries. While being stored, and particularly while being transported, such products are found to be materially changed in weight by receiving or giving up moisture. Besides this change, the dampening or sweating of the berries will result in changes of color that, on account of the usual light color of the berries, are quite marked and greatly injure their sale and bring them down from their legitimate grade, while in substance they may be of good quality. The method by which I obviate the above difficulties is to treat the green berries with oil, by which the pores are sealed and to a large extent rendered impervious to moisture. By this treatment I also obtain another marked advantage—viz., imparting to the berries, particularly of coffee, a darker and richer appearance without the use of pigment, which renders the product more merchantable. Thus, when coffee from long storage, or from other causes which do not intrinsically impair it, has acquired such an appearance as will cause it to be graded lower in the market than it should be, its proper surface may be restored by my method of superficially impregnating the berries with oil. It also improves the roasting qualities of coffee when applied to that berry, for the oil being incorporated in the surface of each berry causes it to roast smoothly and not present a rough appearance. Moreover, in roasting, the previously-applied oil with which the exterior of the coffee berry is impregnated passes off in place of the natural oil and aroma of the berry, thus to a large degree preserving the latter. The oil may be of any desired and suitable kind, preferably tasteless and inodorous. By my process I can apply the oil uniformly and in a limited quantity only to the exterior of the berries without penetrating and being absorbed in injurious quantities by the fibrous husk which remains in the crease of most of such berries.

I attain these ends by taking what I will term an "intermedium"—such as bran, sawdust, rags, chaff, or other coarse fibrous substance capable of acting as a vehicle for the oil—and permeating it with the oil. I then place the berries and this substance together in a suitable receptacle—such as a rumble or shaker—where they are agitated, mixed, and thoroughly rubbed together. Besides acting as a vehicle to convey the oil to the exterior of the berries and preventing it from being absorbed by the fibrous substance contained in the crease thereof, the intermedium acts as a polishing and cleaning agent. The result of the process is, that the berries are superficially impregnated with oil, which changes their color and gives them a darker and richer appearance, and seals their pores and gives a capacity for resisting moisture or dryness, and in the case of coffee improves its roasting qualities.

I have found that some oil-bearing seeds, when properly prepared, as by crushing, furnish in themselves both an oil and an intermedium for the purposes above described. Such seeds as flaxseed, hemp-seed, or cottonseed are suitable for this purpose.

I would state that I consider my method of oiling coffee and other products to which the process is applicable, by means of an intermedium, which conveys oil evenly to the surface of the berry without permitting its crease to be soaked or unduly impregnated with oil, to be new, whether applied to the green or roasted berry.

The coloring of coffee by any of the pigments commonly used for this purpose may also be effected in conjunction with my oiling process, as by the intermedium the coloring-pigment as well as the oil is uniformly distributed superficially upon the berries without collecting in their creases.

The proportions of the different materials to be used in carrying out my process depends largely upon the condition of the berry as to dryness and color. I attain good results by using to twenty-five hundred pounds of coffee about three quarts of an intermedium—such as bran—and about one pint of oil. When a coloring-pigment is used, about two or three ounces are sufficient for the above quantity of coffee. For a green color one ounce of indigo and two ounces of turmeric are a good proportion for the above-mentioned quantity of coffee.

When the agitation is effected by a rumble, about fifteen or twenty minutes' action is suitable for oiling. When a pigment also is used, I find that about twice that time is necessary for the best results. After sufficient agitation the mass is removed from the rumble or shaker and the berries and intermedium separated by any suitable means, such as an air-blast or a riddle. The berries may be cleaned before the application of my process, or labor may be saved and the same results accomplished by letting the separation above referred to serve also to rid the coffee or other products of dust, shells, or foreign substances.

I am aware that coffee has been oiled after it has been roasted and preparatory to grinding and making it into cakes, and that it has been roasted and colored with a pigment simultaneously, as shown by Patent No. 134,791, to Evans; also, that bran has been used in a rumble for polishing metallic articles. I do not claim such operations, broadly.

What I claim is—

1. The herein-described process for coloring, polishing, and sealing the pores of coffee and analogous products, consisting in agitating, mixing, and rubbing together the berries of the product and a coarse oil-bearing intermedium, such as bran impregnated with oil or an oil-bearing seed, substantially as set forth.

2. The herein-described process for coloring, polishing, and sealing the pores of coffee and analogous products, consisting in agitating, mixing, and rubbing together the berries of the product and a coarse oil-bearing intermedium, such as bran impregnated with oil or an oil-bearing seed, said intermedium having also combined with it a coloring-pigment, substantially as set forth.

3. The herein-described process for coloring, polishing, and sealing the pores of coffee and analogous products, consisting in agitating, mixing, and rubbing together the berries and an oil-bearing seed, as cotton-seed, substantially as set forth.

WILLIAM S. LONG.

Witnesses:
C. D. MOODY,
P. WHITE.